United States Patent [19]

Raymer et al.

[11] Patent Number: 5,076,256
[45] Date of Patent: Dec. 31, 1991

[54] EASILY ASSEMBLED BARBECUE GRILL WITH DETACHABLE ACCESSORY SHELF AND SNAP-IN WHEELS

[75] Inventors: Doyle Raymer; Frederick R. Wells, both of Freeport, Ill.

[73] Assignee: The Thermos Company, Inc., Freeport, Ill.

[21] Appl. No.: 549,400

[22] Filed: Jul. 6, 1990

[51] Int. Cl.5 .................................. F24C 3/00
[52] U.S. Cl. .......................... 126/41 R; 126/25 R; 248/188
[58] Field of Search ..................... 126/41 R, 25 R; 248/188, 240.4, 293

[56] References Cited

U.S. PATENT DOCUMENTS 4,677,964 7/1987 Lohmeyer et al. ............... 126/41 R
4,955,358 9/1990 Harris et al. .................... 126/41 R X Primary Examiner—Larry Jones
Attorney, Agent, or Firm—Harness, Dickey & Pierce

[57] ABSTRACT

The accessory shelves are detachably hung on pins, allowing the shelves to be rotated to a folded down and stored position, or to be rotated to a horizontal locked position for use. The shelves are attachable and detachable without the use of tools or fasteners. The wheels are readily installed by the consumer without tools by sliding the axle pins through the wheels and securing them in the axle holders. The wheels are held by snap-in detent action of the annular recess of the axle and the protruding catch of the axle holder.

2 Claims, 8 Drawing Sheets

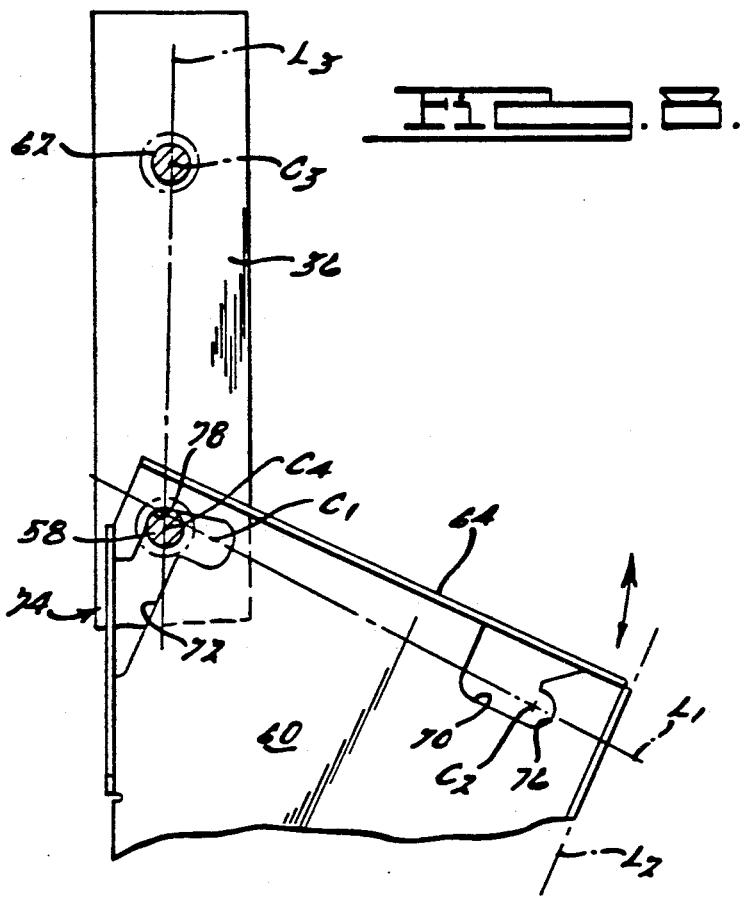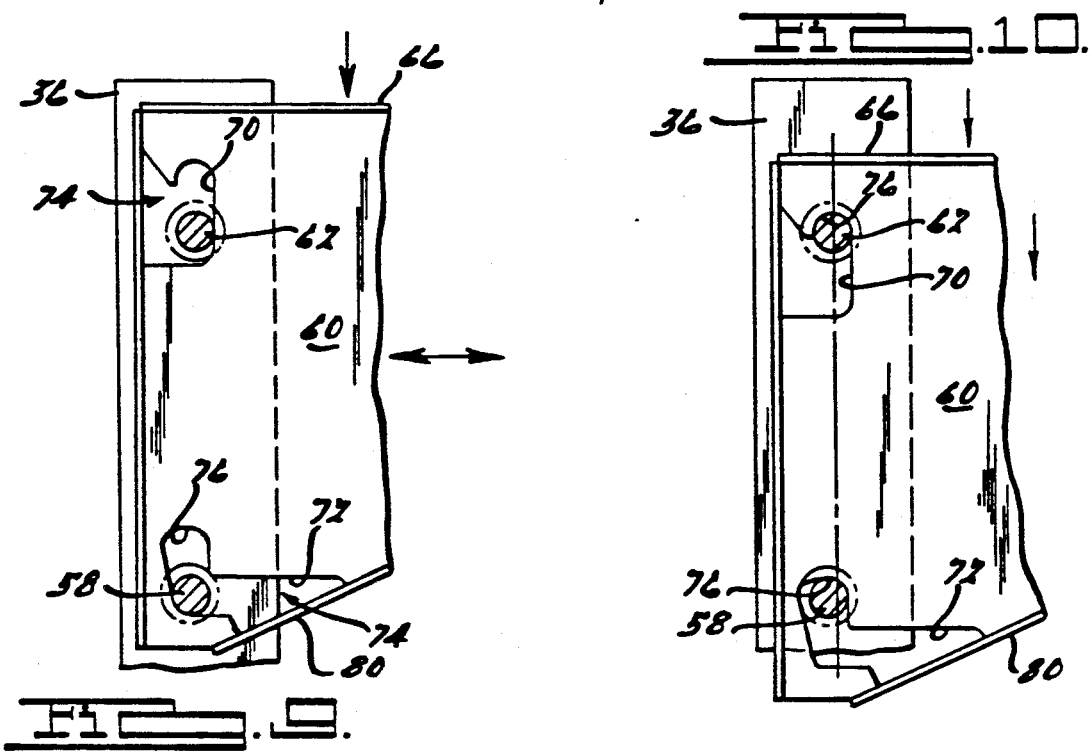

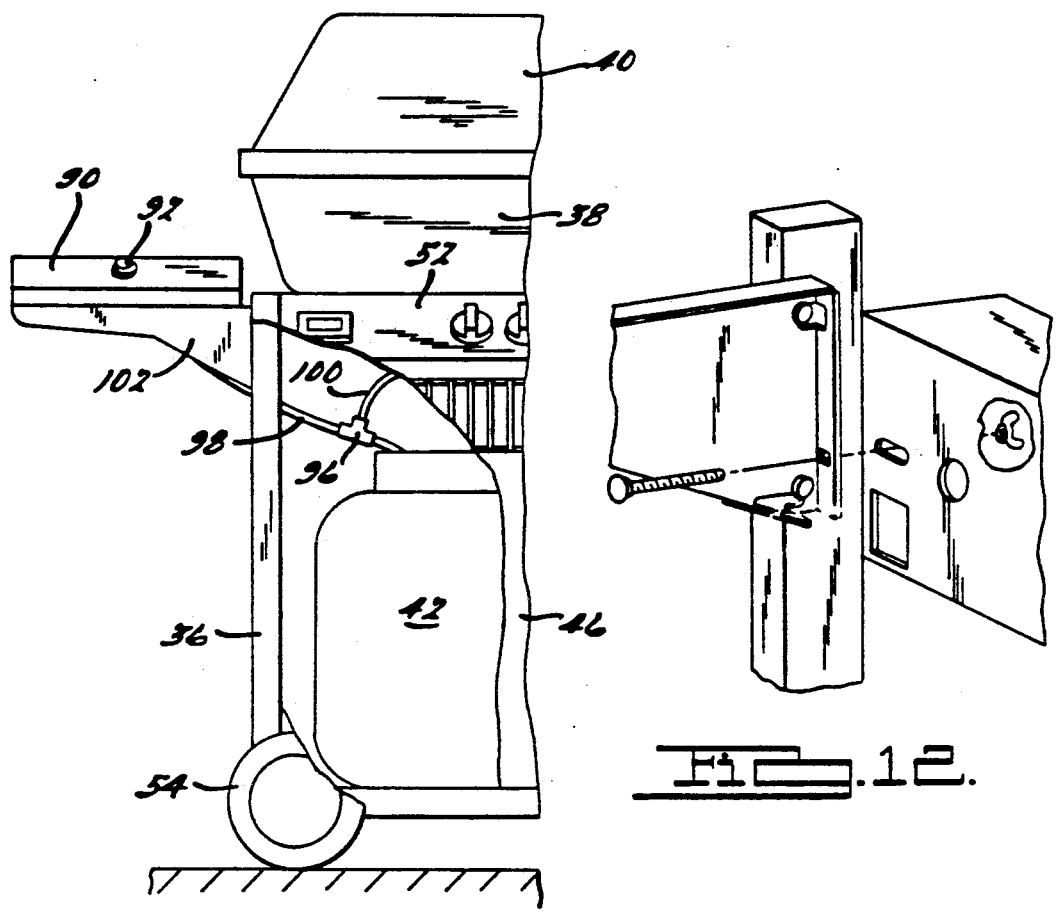
FIG. 11.
FIG. 12.
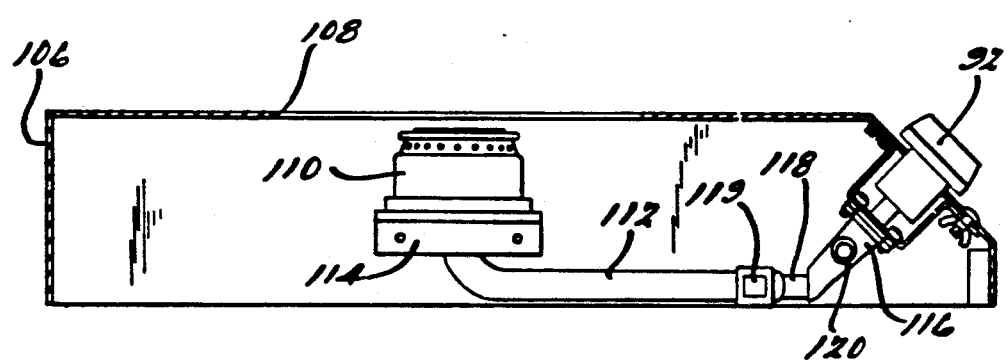
FIG. 13.

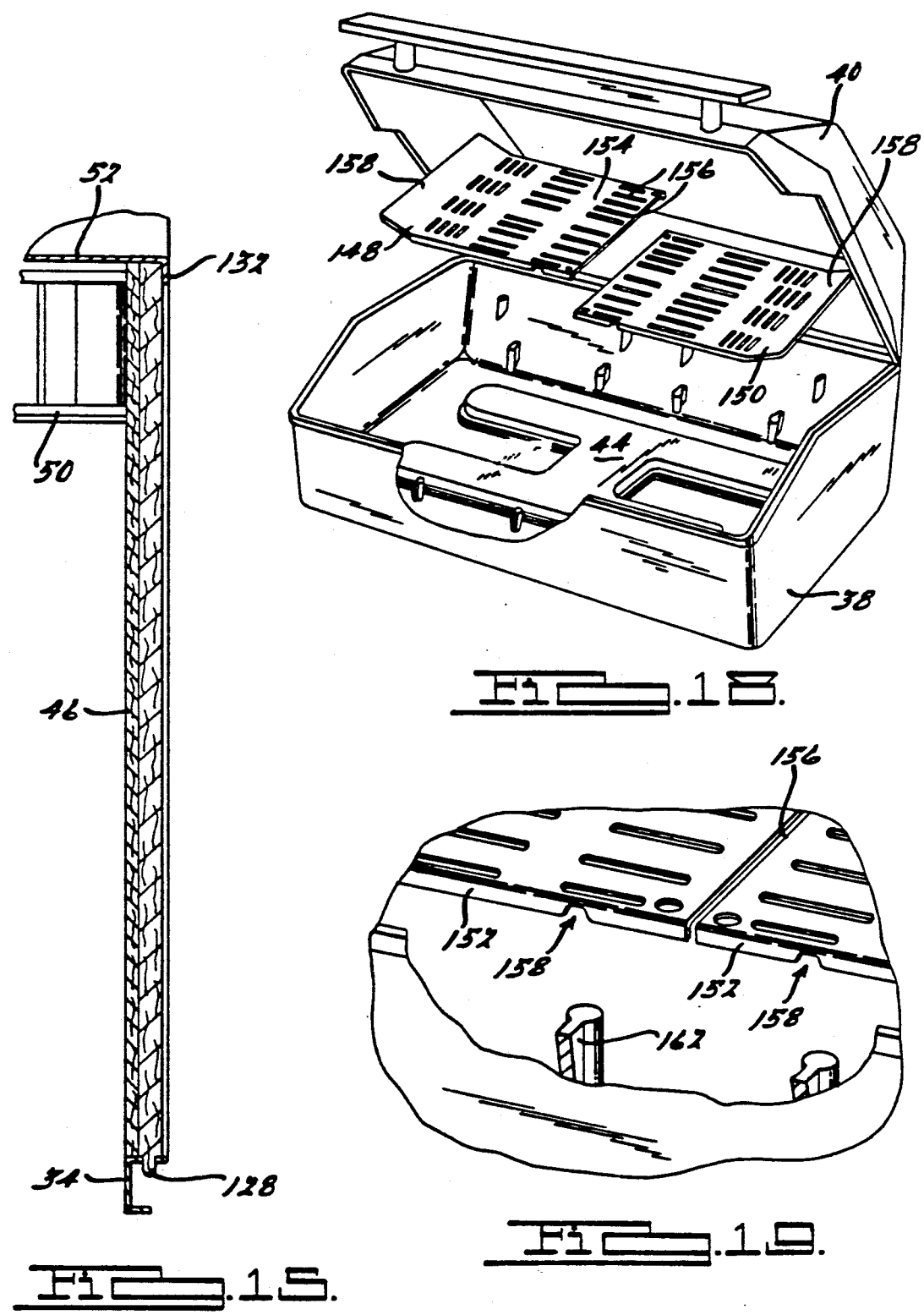

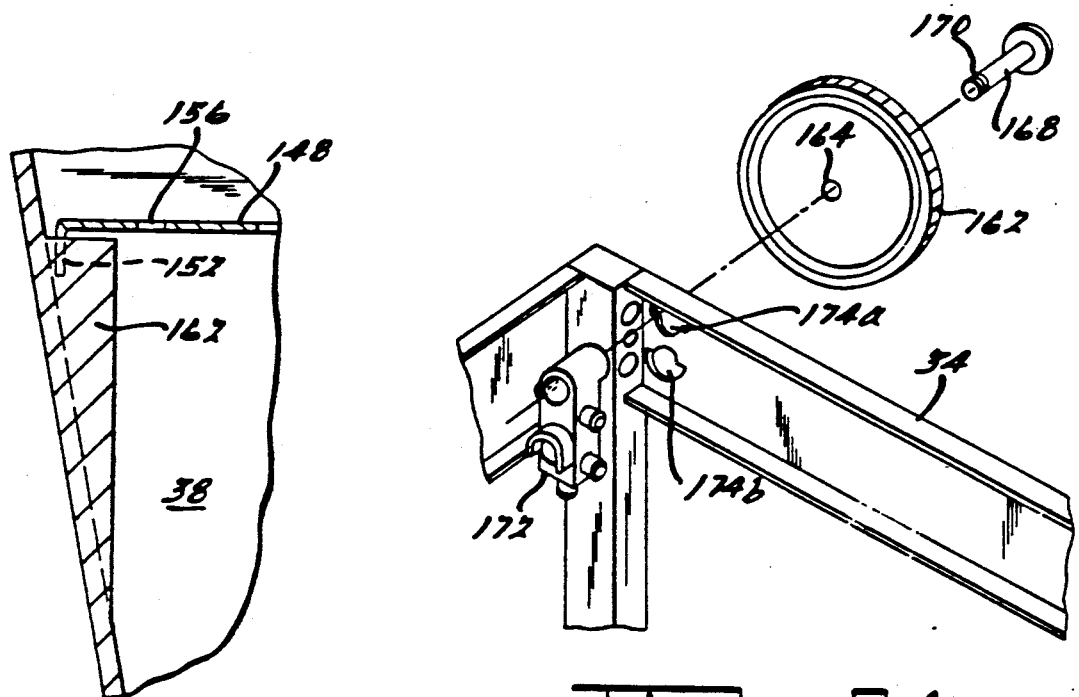
FIG. 20.
FIG. 21.
FIG. 22.
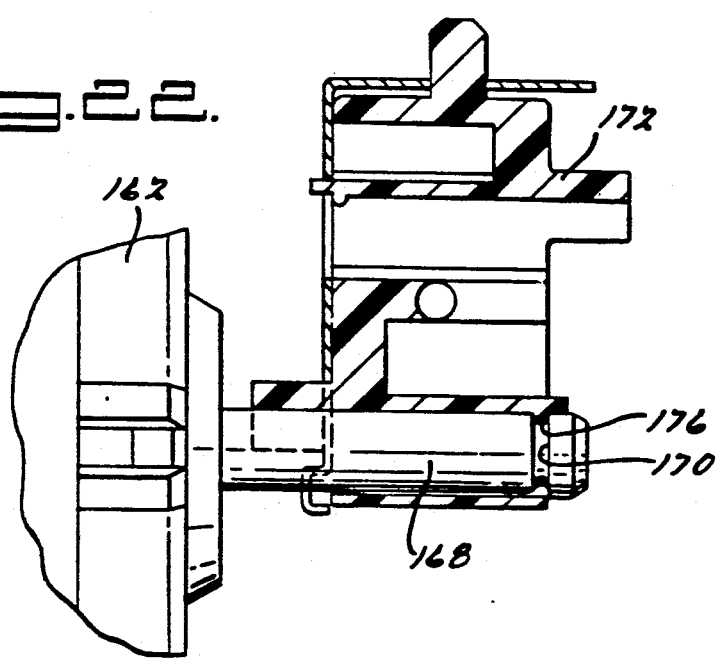

EASILY ASSEMBLED BARBECUE GRILL WITH DETACHABLE ACCESSORY SHELF AND SNAP-IN WHEELS

BACKGROUND AND SUMMARY OF THE INVENTION

The invention relates generally to gas barbecue grills and more particularly to a barbecue grill construction in which the major components may be preassembled at the factory for final assembly by the end user with minimal fasteners, tools and effort. The preassembled modular construction reduces shipping package size, affording lower shipping costs and the minimal number of fasteners greatly reduces end user assembly time and the possibility of lost parts and assembly errors.

Conventional gas barbecue grills in popular use today comprise a containment casting which houses the burner assembly and a framework or stand upon which the casting is placed. Although some attempts have been made to achieve a factory-assembled unit which the end user can simply remove from the shipping carton and use, there is still a great deal of room for improvement. Because many users prefer a grill having outwardly extending side shelves, condiment racks and the like, it has not heretofore been practical to offer a factory-assembled grill of this type without greatly increasing the size of the shipping container. Shipping costs contribute significantly to the overall cost of the grill. Hence the larger the shipping carton, the more cargo space and warehouse space is required and the more expensive the grill.

The more common approach has been to offer a barbecue grill which is shipped in a disassembled state, to be fully assembled by the end user. Frequently the disassembled grill will be accompanied by one or more bags of bolts, nuts and assorted small parts and other fasteners. Many persons find the assembly of such grills to be quite tedious and challenging. Often tools are required which the consumer either does not own or which the consumer is not sufficiently practiced in using. While some retailers may be equipped to fully assemble and deliver the grill for the consumer, most retailers, particularly those selling high volumes, simply cannot offer such services and still remain competitive in the marketplace. This leaves the consumer with the tedium of grill assembly before the first barbecue can commence.

The present invention offers a departure from the conventional barbecue grill by offering factory-assembled modular units which easily assemble to form the completed grill by hanging or placing the modules in position. A minimal number of fasteners and a minimal use of tools are required. The presently preferred embodiment may be assembled without tools and uses only a pair of loose wing nut fasteners (these are used to attach a handle to the lid). If a side burner attachment is desired, additional fasteners are employed, which may also be assembled without tools. As a result, the assembly instructions for the present barbecue grill are considerably simpler than those of conventional design. Moreover, assembly is so straightforward that many will not need to make extensive use of the assembly instructions.

According to one aspect of the invention, the barbecue grill comprises a frame, a combustion source containment member supported on the frame and one or more readily attachable and detachable accessory shelves mounted on the upstanding portion of the frame. Each shelf is mounted for selective movement to a first position in which the shelf is rigidly supported in a generally horizontal position; to a second position in which the shelf is pivotally supported to permit rotation to a generally vertical, hanging position; and to a third position in which the shelf is free to be detached from the frame. The shelf is thereby readily attachable and detachable by the end user in a simple and straightforward manner, without the need for tools.

Further in accordance with the invention, the barbecue grill includes a plurality of readily attachable and detachable wheels mounted on the frame. Each wheel has its own pop-in axle which is received in an axle supporting means with detent to retain the individual wheel and axle. The resulting grill can be packaged without wheels and accessory shelves in a compact configuration requiring a shipping container large enough only to accommodate the generally rectangular frame and containment casting. Like the readily attachable shelf, the wheels are easy to install without tools or additional fasteners, by simply sliding the axle through the wheel and popping the wheel and axle assembly into the axle support until the detent clicks into place.

In models where a decorative front panel is desired, the invention provides an easily assembled pop-in panel. The lower edge of the panel is held in place within the confines of the rectangular frame by alignment pins and apertures. The upper portion of the panel is held in place by being captured between the structural member on the frame and a readily attachable and detachable condiment rack. The frame structural member may be a downturned flange forming part of the valve housing or control panel, while the condiment rack is preferably a wire frame rack having means for readily attaching to the frame by hanging.

Further in accordance with the invention, an optional side burner accessory is provided. The side burner may be attached using mounting bracket supporting means such as those used to implement the accessory shelf. A locking means is provided to securely lock the side burner in the horizontal position of use.

Still further, the invention provides readily installed heat distribution plates which are disposed in a generally vertical plane above the burner within the lower containment casting. The heat distribution plates spread the heat uniformly across the entire grill surface, preventing hot spots. The heat distribution plates have slotted openings to allow a controlled flare-up which enhances the barbecued flavor. The heat distribution plates are dropped into place by engagement of lugs and flanges. Again, no tools or fasteners are required.

The resulting barbecue grill is economical to ship and simple to assemble and use. It has a number of features and advantages not found in conventional barbecue grill constructions. For a more complete understanding of the invention, its objects and advantages, reference may be had to the following specification and to the accompanying drawings.

BRIEF DESCRIPTION OF THE DRAWINGS

FIG. 8 is a partial cross sectional view illustrating the supporting pins and apertures in the pivotally supported hanging position;

FIG. 9 is a partial cross sectional view similar to FIG. 8 illustrating the bracket supporting means in an intermediate position permitting the accessory shelf to be moved to the pivotally supported position or moved to the horizontally locked position;

FIG. 10 is a partial cross sectional view similar to FIG. 8 illustrating the bracket supporting means in the horizontally locked position;

FIG. 11 is a partial front view illustrating an optional accessory side burner;

FIG. 12 is a detailed view illustrating the preferred means of securing the side burner in the generally horizontal use position;

FIG. 13 is a cross sectional view of the side burner illustrating burner, venturi and valve components;

FIG. 15 is a cross sectional view taken vertically through the protruding pin to illustrate the means of panel retention;

FIG. 18 is an exploded perspective view illustrating the heat distribution plates;

FIG. 19 is an enlarged detailed view showing the preferred means for retaining the heat distribution plates within the containment casting;

FIG. 20 is a cross sectional further illustrating the preferred means of heat distribution retention;

FIG. 21 is an exploded perspective view of the presently preferred wheel assembly;

FIG. 22 is a cross sectional view through the axle of the wheel assembly of FIG. 21 illustrating the detent retention means;

DESCRIPTION OF A PREFERRED EMBODIMENT

Figure 1:
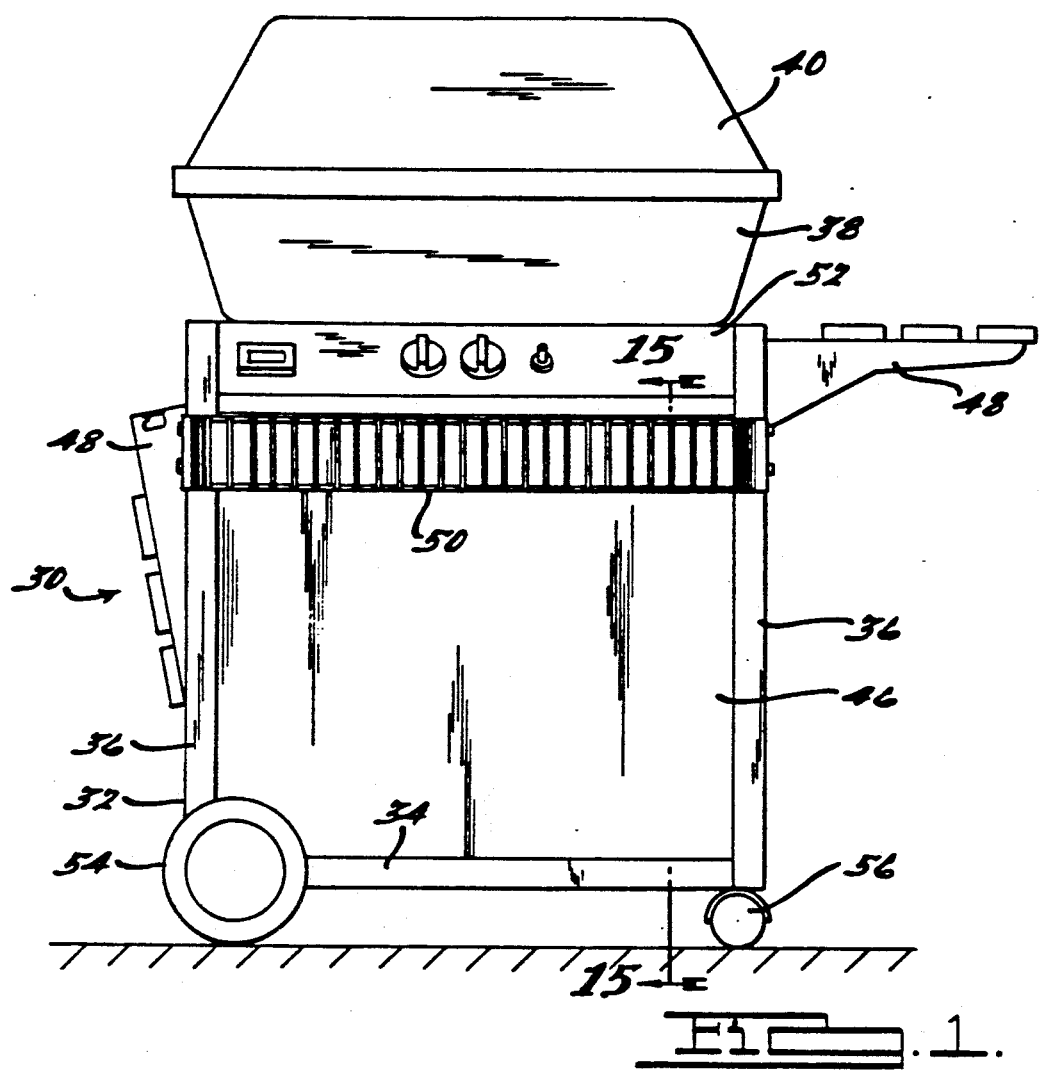
FIG. 1 is a front elevation view of the barbecue grill according to the invention.

Referring to FIG. 1, the barbecue grill of the invention is illustrated generally at 30. The grill comprises a rectangular frame 32 having a horizontal base portion 34 and vertically upstanding legs 36 which in turn support the containment casting. The containment casting is constructed in the usual fashion, having a lower containment casting 38 and an upper containment casting or lid 40. A fuel tank 42 (FIG. 11) rests on base 34 and supplies fuel to the burner 44 (FIG. 18). If desired, a decorative pop-in front panel 46 is positioned in a generally horizontal plane upon base 34 and between legs 36.

The pop-in front panel thereby obscures the frontal view of fuel tank 42, as illustrated in FIG. 1.

The barbecue grill assembly further comprises at least one and preferably two accessory shelves 48. These shelves pivot to assume various positions including a substantially horizontal use position and a generally vertical folded or stowed position. Accordingly, in FIG. 1, the accessory shelf illustrated on the right-hand side is in the horizontal position, and the accessory shelf on the left-hand side is in the generally vertical or folded down position. The details of the accessory shelves and the various positions which they may assume are discussed more fully below.

The barbecue grill may also include an easily assembled condiment rack 50, which assists in retaining front panel 46. As illustrated, the condiment rack is disposed generally below the control panel 52 which houses the valve assemblies and ignition switch for regulating fuel and igniting burner 44. To enhance portability, frame 32 includes a pair of wheels 54 and a pair of casters 56. Casters 56 pivot about a vertical axis to allow the grill assembly to be steered in any desired direction.

Figure 2:
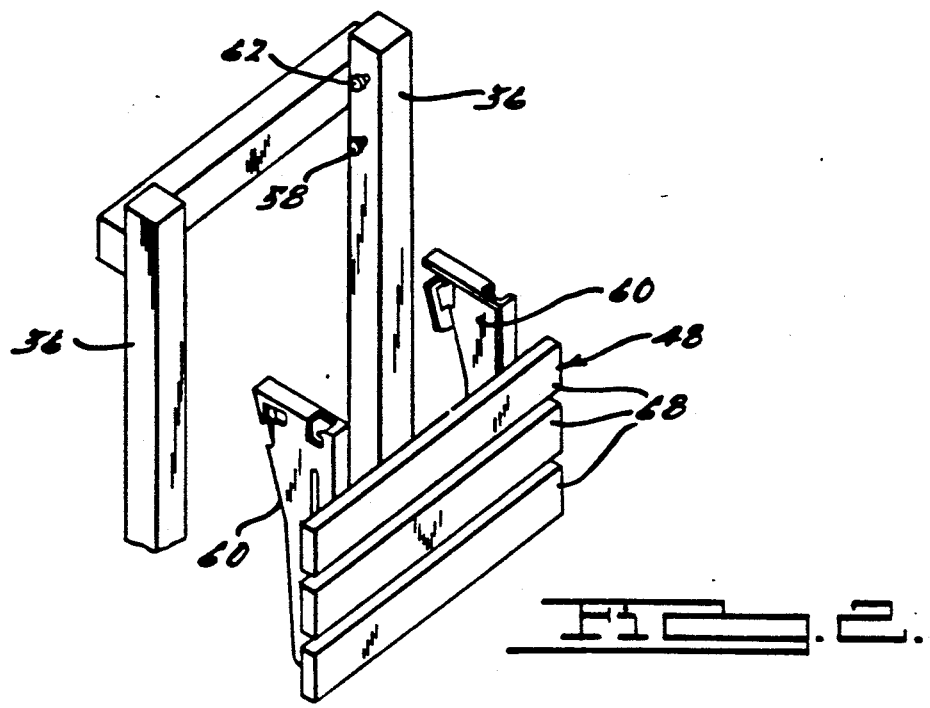
FIG. 2 is a perspective view of the accessory shelf in a position to illustrate attachment and detachment.
Figures 3, 4:
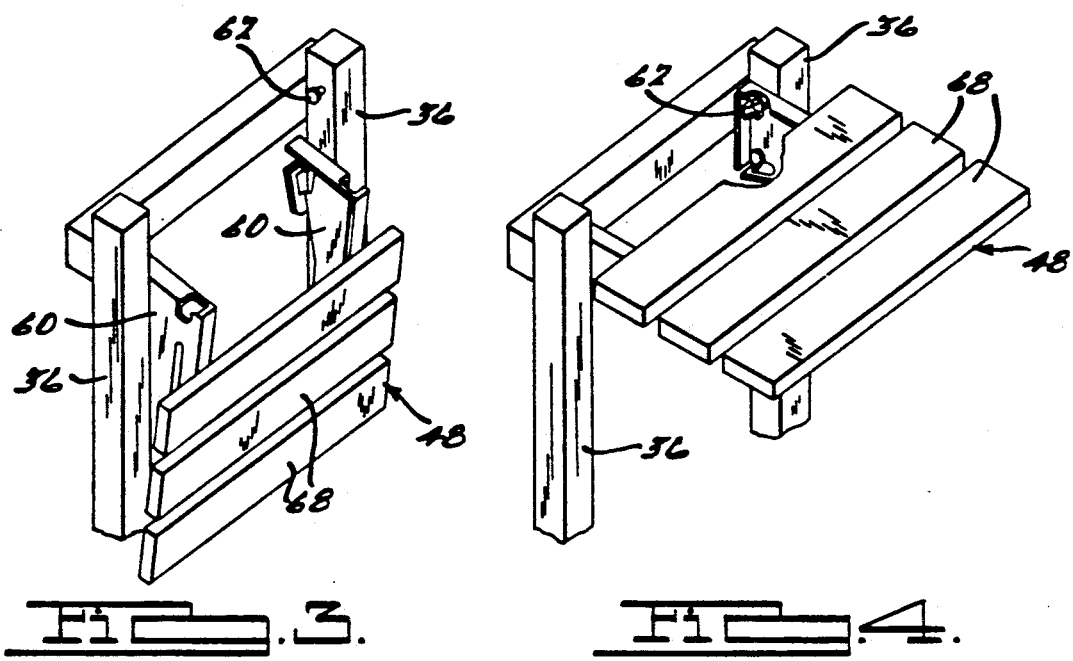
FIG. 3 is a perspective view of the accessory shelf in position to illustrate the pivotally supported hanging position with shelf generally vertical.
FIG. 4 is a perspective view of the accessory shelf in the rigidly supported horizontal position of use.

FIGS. 2, 3 and 4 illustrate the manner in which accessory shelf 48 is attached and pivoted to various positions. Specifically, FIG. 2 illustrates the shelf in proper orientation for attaching by hanging upon lower pins 58. As illustrated, the accessory shelf 48 comprises a pair of supporting brackets 60 which are spanned by a plurality of boards or slats 68 which make up the working surface of the shelf. These brackets are provided with apertures (discussed more fully in connection with FIGS. 5-7) which in various positions engage lower pins 58 and upper pins 62. For example, FIG. 3 illustrates the accessory shelf hanging from lower pins 58 in the folded down position. FIG. 4 illustrates the shelf in the horizontal use position in which both lower pins 58 and upper pins 62 are engaged.

Figures 5, 6:
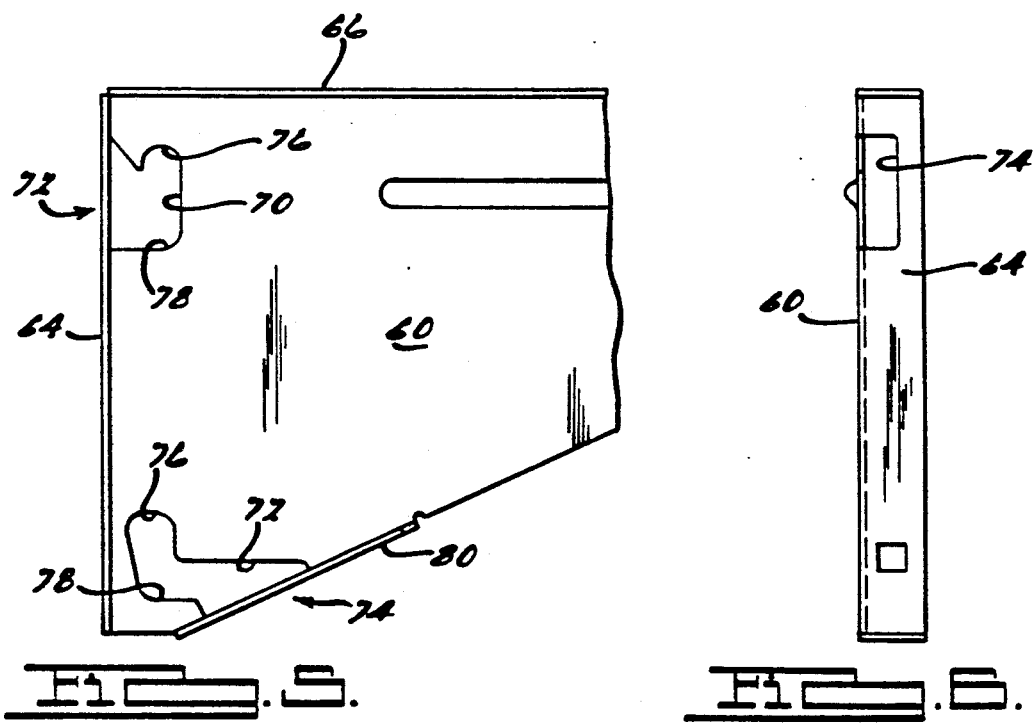
FIG. 5 is a detailed view of the bracket supporting means illustrating the configuration and arrangement of the upper and lower apertures.
FIG. 6 is a detailed view of the bracket supporting means illustrating the open end of the upper aperture.
Figure 7:
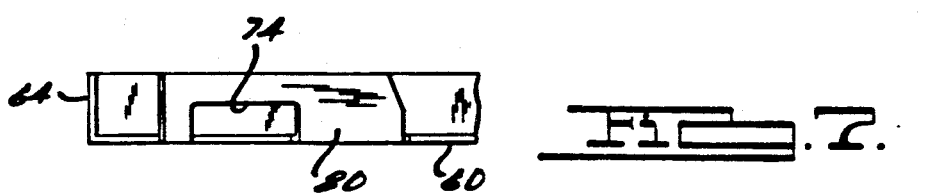
FIG. 7 is a detailed view of the bracket supporting means illustrating the open end of the lower aperture.

The details of the presently preferred supporting bracket 60 may be seen from FIGS. 5-7. Each supporting bracket 60 is preferably stamped from sheet metal and bent at right angles along certain sides to form side flanges 64, 66 and 80. These side flanges make the bracket more rigid, with side flange 66 serving as a support on which slats 68 are secured. As best seen in FIG. 5, bracket 60 has a pair of generally L-shaped apertures, an upper aperture 70 and a lower aperture 72. Each aperture has an open end 74, a closed end 76 and an intermediate vertex 78. The open end of upper aperture 70 is also seen in FIG. 6 while the open end of lower aperture 72 is also seen in FIG. 7. Specifically, the open end 74 of upper aperture 70 is formed by cutting out a portion of side flange 64, as seen in FIG. 6. The open end 74 of lower aperture 72 is formed by cutting out a portion of side flange 80. As constructed, both apertures 70 and 72, including the respective closed ends 76 and vertices 78, lie in the plane defined by supporting bracket 60. The open ends 74 of both apertures provide access openings in the plane defined by supporting bracket 60. These access openings allow pins 58 and 62 to slide into and out of engagement with the apertures, without substantial deformation of either the frame 32 or the supporting brackets 60.

FIGS. 8, 9 and 10 illustrate the manner in which the pins and apertures engage to provide the various shelf positions. Referring first to FIG. 8, the bracket 60 is shown in the folded down position corresponding to the shelf position shown in FIG. 3. In this case, upper aperture 70 is fully disengaged from upper pin 62 (and the bracket 60 rotated clockwise). The bracket hangs on lower pin 58 with the vertex portion 78 of lower aperture 72 engaging pin 58. The rounded configuration of vertex 78 permits pivotal rotation of bracket 60 about pin 58.

For instance, the bracket may be rotated counter-clockwise to the position illustrated in FIG. 9. During such rotation, the open end 74 of upper aperture 70 will receive upper pin 62 without requiring substantial deformation of either frame or bracket. Counter-clockwise rotation is checked when upper pin 62 touches bracket 60 as shown in FIG. 9. Next, as illustrated in FIG. 10, the bracket may be slid downwardly so both pins engage the respective closed ends 76 of the apertures. In this position, the accessory shelf is in the substantially horizontal position depicted in FIG. 4. In this regard, the centers ($C_1$ and $C_2$—FIG. 8) of the closed ends 76 define a line $L_1$ which has a predefined angular relationship to the line $L_2$ defined by side flange 66. Similarly, the centers $C_3$ and $C_4$ of pins 58 and 60 define a line $L_3$ which has an angular relationship to the longitudinal dimension of the frame legs 36. With the pins and apertures engaged as illustrated in FIG. 10, the respective center lines of closed ends 76 and of pins 58 and 62 are coincident and parallel. Thus the angular relationship between bracket side 66 and base leg 36 is now fixed. By proper geometric location of the pins and closed ends, a substantially horizontal shelf position is achieved. If desired, pins 58 and 62 can be centered along a vertical line and closed ends 76 can be centered along a line perpendicular to the line $L_2$ of side flange 66. This will insure a substantially horizontal shelf position, provided the frame is resting on level ground so that the legs are vertical. Of course, other pin and slot relationships can also achieve a substantially horizontal shelf position as described by the foregoing.

Rotation of the shelf from the horizontal to the folded position is performed essentially in the reverse manner: lifting the bracket from the position shown in FIG. 10 to the position shown in FIG. 9 and then rotating clockwise to the position shown in FIG. 8, allowing pin 62 to clear aperture 70 through the open end 74. To fully remove the shelf as shown in FIG. 2, one simply starts with the bracket in the FIG. 8 position and then lifts, following the contour of aperture 72, until pin 58 clears the opening 74.

Referring now to FIG. 11, the optional accessory side burner is illustrated at 90. The side burner provides an auxiliary heat source similar to those found on indoor gas ranges. The auxiliary side burner has its own valve control knob 92 and is supplied with fuel from fuel tank 42 through T-fitting 96 and fuel supply hose 98. The main burner 44 (FIG. 18) of barbecue grill 30 is also supplied by fuel tank 42 through T-fitting 96 and fuel supply hose 100. The auxiliary side burner is supported on frame 32 by brackets 102 constructed generally the same as brackets 60 of the accessory shelf 48.

In the case of the accessory side burner, it is important to prevent the burner from rotating out of the horizontal position. Accordingly, locking means 104 in the form of a wing nut and bolt combination are provided as illustrated in FIG. 12. During assembly of the side burner, the user hangs the bracket supporting means on the supporting pins, similar to the manner in which the accessory shelf is attached. Then, the bolt and wing nut are installed through the holes provided in bracket and frame to securely lock the burner in the horizontal use position.

FIG. 13 illustrates additional details of the preferred side burner assembly. As shown, the side burner includes a housing 106 with appropriate opening 108 to accommodate the flame from burner 110. Burner 110 and the associated venturi 112 are secured to the side walls of the housing by a bracket 114. Valve 116 supplies fuel to the venturi through outlet tube 118 adjacent air intake 119. Valve 116 is coupled via nipple 120 to the hose 98 (FIG. 11).

Figure 14:
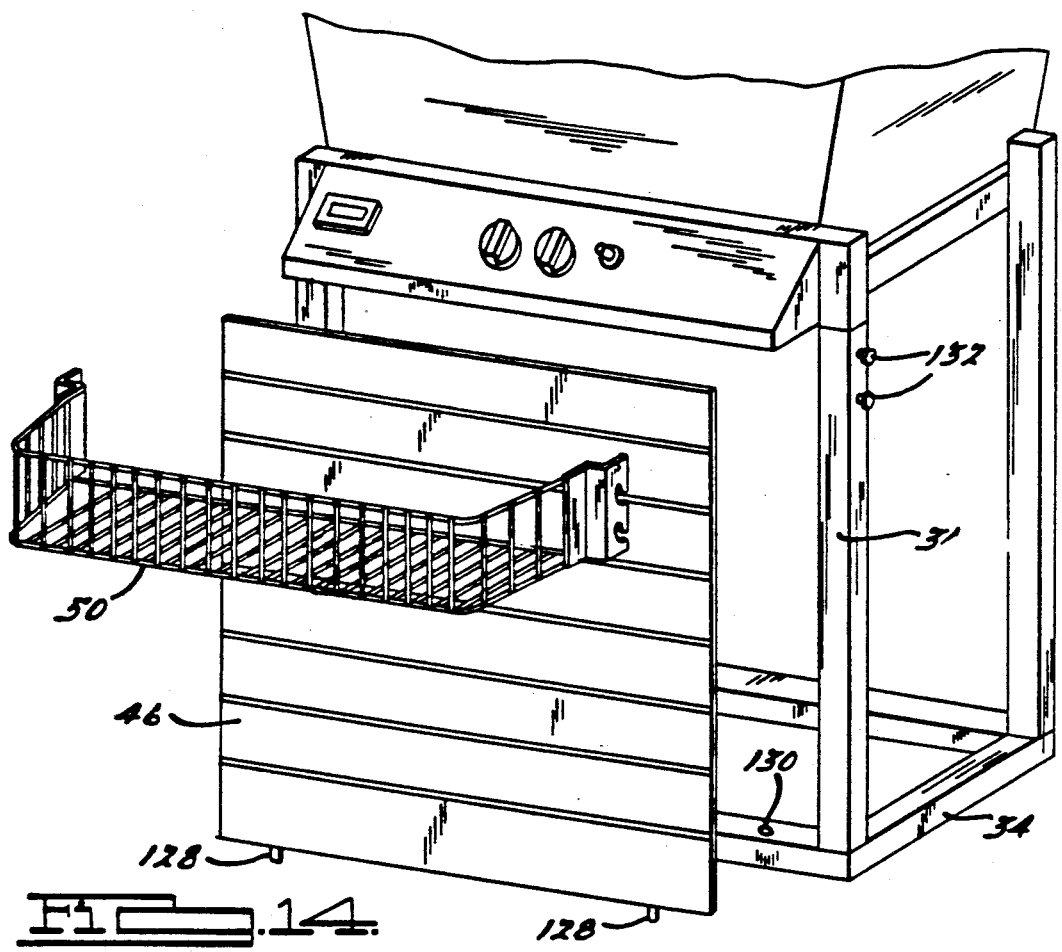
FIG. 14 is an exploded perspective view illustrating the pop-in decorative panel and condiment rack.

The pop-in front panel 46 and easy assemble condiment rack 50 are shown in greater detail in FIG. 14. As shown, the pop-in front panel has a pair of pins 128 which are adapted to fit in holes 130 formed in the base 34 of the frame. Although the embodiment illustrated in FIG. 14 employs pins on the panel and holes in the frame, the opposite arrangement can also be employed. Also, if desired, the alternate arrangement can be implemented using pins formed as part of the hardware used to attach the wheels 54 and casters 56.

Figures 16, 17:
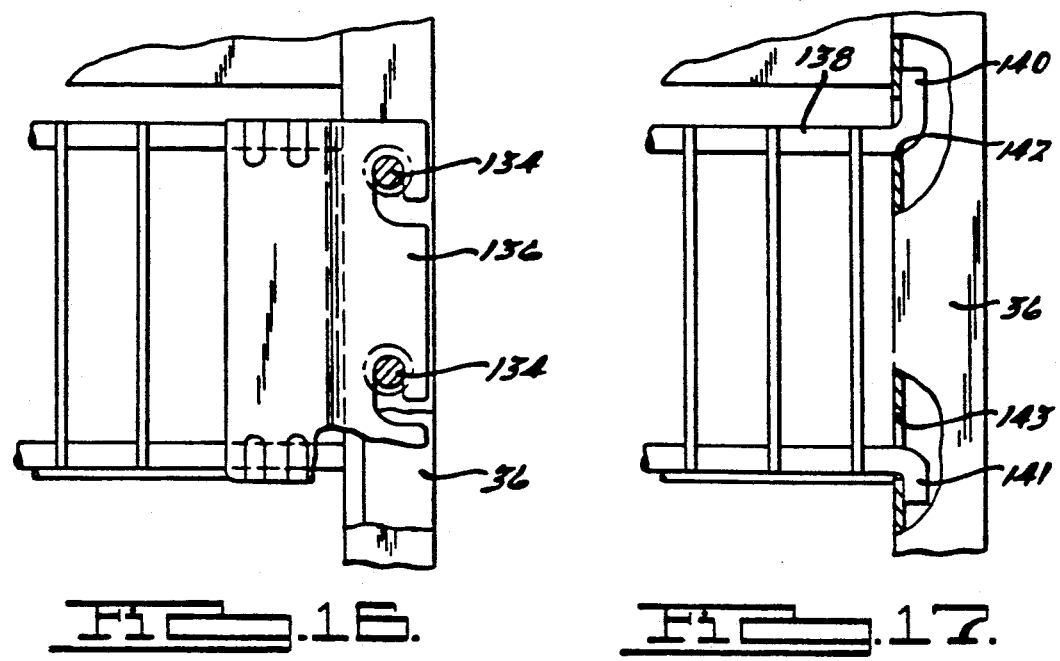
FIG. 16 illustrates a first means for attaching the condiment rack to the frame.
FIG. 17 illustrates a second means of attaching the condiment rack to the frame.

The upper portion of pop-in panel 46 is held in place by being captured between condiment rack 50 and a downturned flange 132 which is formed as part of the control panel 52. This is illustrated in FIG. 15. The condiment rack is attached to the upright legs 36 by hanging either on pins 134 (as illustrated in FIG. 16), or by inserting in holes drilled or punched in the front face of legs 36 (as illustrated in FIG. 17). When pins are employed, a slotted bracket 136 is used to hang the condiment rack in place, as illustrated in FIG. 16. When holes are used to hang the condiment rack, the upper wire frame 138 is formed with an upturned end 140 as illustrated in FIG. 17. When hanging the condiment rack using the FIG. 17 embodiment, the rack is first oriented with the upturned end 140 horizontal to permit it to be inserted in hole 142. Then the condiment rack is pivoted downwardly until the upturned end contacts the inner wall of leg 36. The rack is then lifted upwardly without pivoting to allow lower downturned end 141 to pass through slot 143. When this has been done, the rack is slid downwardly, locking it in place.

Referring now to FIGS. 18 and 19, the heat distribution plates 148 and 150 are preferably fabricated by stamping from sheet metal. The heat distribution plates have downturned edges 152 (FIG. 19) to increase the structural rigidity and to prevent warping under the intense heat from the burner 144. The heat distribution plates are installed so that there is a minimal gap along common edge 156. The left and right side edges 157 are flared upwardly to promote heat flow around the sides by convection. The left and right side edges as well as the front and rear edges are spaced from the side walls of the lower containment casting 38 to allow heat to flow around the distribution plate and into the upper oven space defined by the upper containment casting 40.

The heat distribution plate includes a horizontal portion 154 which has a plurality of slots 156 stamped therein. One purpose of the heat distribution plate is to eliminate hot spots on the cooking surface of the grill and to provide a more uniform heat across the entire cooking surface. During experimentation with the heat distribution plate, it was discovered that a heat distribution plate without holes or slots provided good heat uniformity, but tended to produce a baked rather than grilled flavor. It was discovered that the grilled flavor associated with barbecue grills is at least in part due to the smoke and flare-ups produced by the burning of dripping fats from the food being cooked. While this smoke and flare-up does contribute to the barbecued flavor, excessive flare-up can be problematic, causing the food to taste burnt and creating unwanted smoke residue on the food, on the cooking surfaces and on the grill interior.

The presently preferred heat distribution plate provides controlled flare-up. It produces the desired barbecued flavor without excessive flare-up and smoke. The presently preferred embodiment employs slots arranged in a pattern illustrated in FIG. 18, the slots being approximately 2 inches long, ⅛ inch wide and being spaced 1 inch apart. The presently preferred percentage of slot area to horizontal section surface area is about 6 percent.

As seen in FIGS. 19 and 20, the downturned edges are cut out as at 158 are sized and positioned to mate with the alignment flanges 162 integrally formed in the containment casting side walls. The cutouts 158 are captured on the flanges to hold the heat distribution plates in position with minimal gap along common edge 156. The heat distribution plates are thus properly positioned and aligned by the user during assembly, merely by dropping the plates into place. No tools or complex assembly are required.

Referring now to FIGS. 21 and 22, one embodiment of the pop-in wheel is illustrated. The wheel 162 has an opening 164 to receive the axle 168. The axle has an annular recess 170 which engages a detent axle support mechanism illustrated generally at 172. The axle support 172 is secured to the base 34 of frame 32 through the cutouts 174a and 174b provided. The presently preferred embodiment may be implemented using different sized wheels, and thus two cutouts are provided to provide the proper axle height to accommodate the wheel. Cutout 174a is for the smaller wheel. The axle support is rotated 180° about its longitudinal axis if cutout 174b is to be used. The detent is shown in FIG. 22 at 176.

Figure 23:
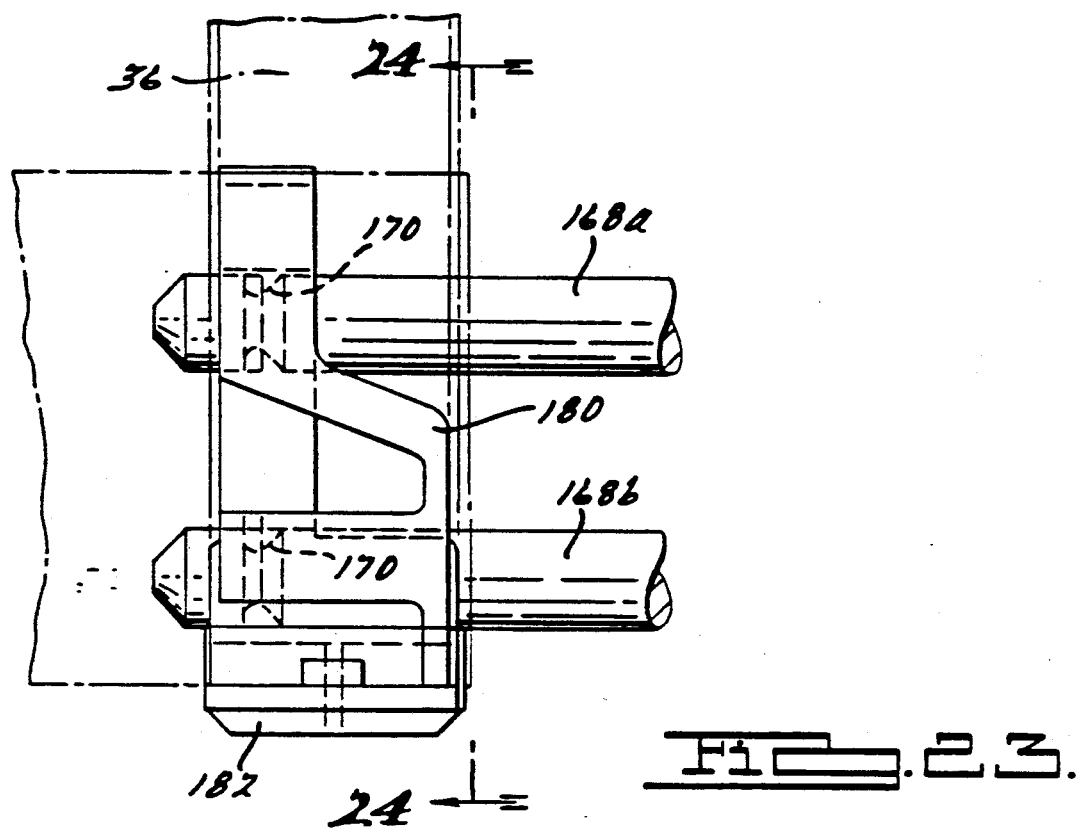
FIG. 23 is a side view of another embodiment of axle holding structure.
Figure 24:
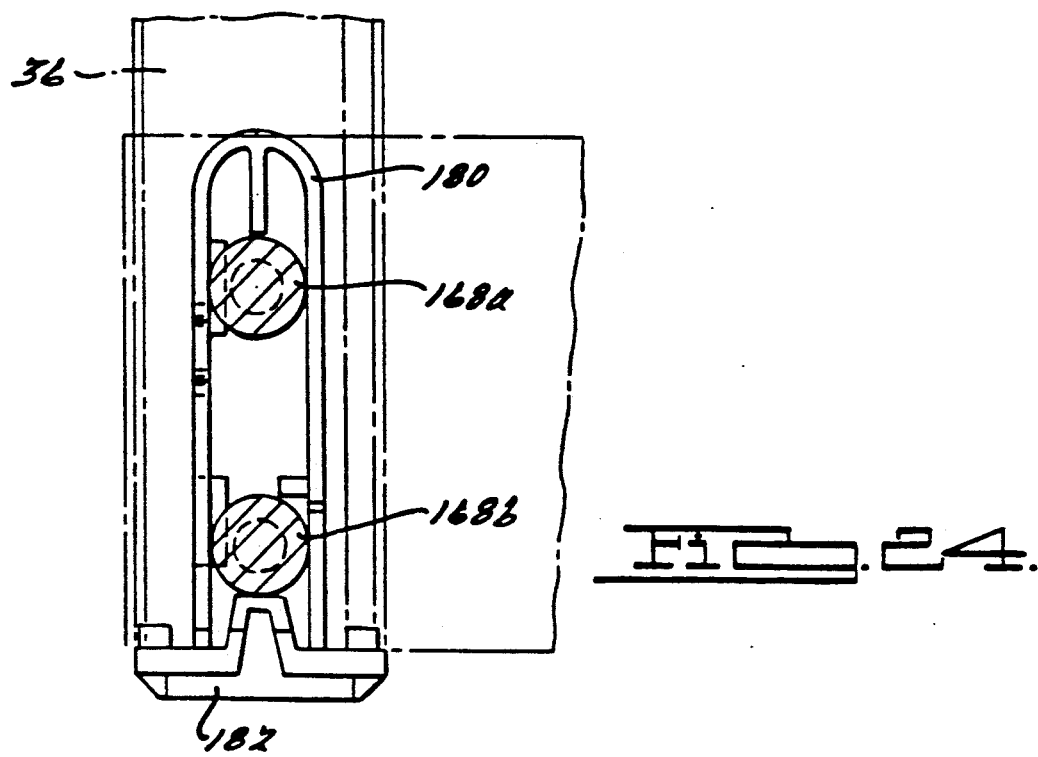
FIG. 24 is a cross sectional view of the assembly of FIG. 23 taken substantially along the line 24—24 of FIG. 23.

An alternate embodiment of pop-in wheel is shown in FIGS. 23 and 24. As in the embodiment of FIGS. 21 and 22, the alternate wheel embodiment of FIGS. 23 and 24 is able to accommodate different sized wheels. For illustration purposes only, two axles 168a and 168b are illustrated in both Figures. It will be understood that in actual use, only one axle would be used in the appropriate position determined by the wheel diameter. In the alternate embodiment a detent mechanism 180 is positioned within the hollow rectangular leg 36, generally as illustrated. The detent mechanism has a structure which provides an end plug 182. Suitable holes are provided in the leg 36 to receive either axle 168a or 168b. As in the embodiment of FIGS. 21 and 22, the axle is placed in the opening of the wheel and the wheel and axle assembly is then slid into the detent mechanism until the annular recess 170 reaches the detent and click in place to hold the wheel and axle on the leg. The detent mechanism 180 of FIGS. 23 and 24 can be fabricated from a flexible plastic material, which has the advantage of being lightweight and inexpensive to manufacture.

While the invention has been described in connection with the presently preferred embodiments, certain modifications can be made without departing from the spirit of the invention as set forth in the appended claims.

What is claimed is:

1. A barbecue grill which can be readily disassembled for compact packaging and storage and readily reassembled for use, said grill comprising:
    a frame having a generally vertical upstanding portion;
    a combustion source containment member supported on said frame;
    a readily attachable and detachable shelf mountable on said frame;
    a plurality of readily attachable and detachable wheels mounted on said frame;
    a plurality of axle pins;
    a plurality of axle supporting means, each of said wheels mountable to said frame by the engagement of one of said axle pins with said wheel and one of said axle supporting means;
    an annular groove disposed on at least one of said axle pins and said axle supporting means;
    a detent disposed on at least one of said axle pins and said axle supporting means, said axle pins engaging said axle supporting means by the engagement of said annular grooves and said detents.

2. The grill of claim 1 wherein said axle supporting means are made of plastic.

* * * * *